United States Patent
Singh et al.

(10) Patent No.: US 11,262,997 B2
(45) Date of Patent: Mar. 1, 2022

(54) PARALLEL SOFTWARE DEPLOYMENT SYSTEM

(71) Applicant: Walmart Apollo, LLC, Bentonville, AR (US)

(72) Inventors: Robin Singh, Bengaluru (IN); Trushangi G. Pradhan, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 42 days.

(21) Appl. No.: 16/678,885

(22) Filed: Nov. 8, 2019

(65) Prior Publication Data
US 2020/0150943 A1 May 14, 2020

Related U.S. Application Data

(60) Provisional application No. 62/820,538, filed on Mar. 19, 2019.

(30) Foreign Application Priority Data

Nov. 9, 2018 (IN) .............................. 201811042295

(51) Int. Cl.
*G06F 9/44* (2018.01)
*G06F 8/61* (2018.01)
(Continued)

(52) U.S. Cl.
CPC ............ *G06F 8/61* (2013.01); *G06F 9/45512* (2013.01); *G06F 9/54* (2013.01); *H04L 63/168* (2013.01)

(58) Field of Classification Search
CPC .......... G06F 8/61; G06F 9/45512; G06F 9/54; H04L 63/168
(Continued)

(56) References Cited

U.S. PATENT DOCUMENTS 8,112,747 B2 * 2/2012 Haeberle ................. G06F 9/542
717/172
8,825,964 B1 * 9/2014 Sopka ................... G06F 3/0647
711/152
(Continued)

FOREIGN PATENT DOCUMENTS

WO 2017205220 A1 11/2017

OTHER PUBLICATIONS

Rob Giseburt, "Using SSH Through A Bastion Host Transparently", 2015, Ten Mile Square Technologies, retrieved from https://tenmilesquare.com/using-ssh-through-a-bastion-host-transparently/, 8 pages. (Year: 2015).*
(Continued)

*Primary Examiner* — Ted T. Vo
(74) *Attorney, Agent, or Firm* — Duane Morris LLP; Manita Rawat (57) ABSTRACT

Systems and methods for performing parallel program installations using a script-based installation mode are provided. An exemplary system can include: a plurality of backend servers on which a plurality of scripts is executed to automatically install application programs; and an application server, the application server being configured to: receive a plurality of web service calls from a user device via a user interface; locate web services in response to the web service calls; and send a plurality of Secure Shell (SSH) calls to a plurality of backend servers; in response to the web service calls, provide and expose the plurality of the scripts being as the web services, wherein a number of the web service calls processed by the application server are based on a hardware capacity of the application server.

18 Claims, 4 Drawing Sheets

(51) Int. Cl.
*G06F 9/54* (2006.01)
*G06F 9/455* (2018.01)
*H04L 29/06* (2006.01)

(58) Field of Classification Search
USPC .................................................. 717/174–178
See application file for complete search history.

(56) References Cited

U.S. PATENT DOCUMENTS

| | | | |
|---|---|---|---|
| 8,869,140 | B2 | 10/2014 | Todorova |
| 9,645,858 | B2 | 5/2017 | Winterfeldt et al. |
| 9,747,466 | B2 | 8/2017 | Beckman et al. |
| 9,756,120 | B2 | 9/2017 | Teibel et al. |
| 10,171,383 | B2 * | 1/2019 | Johnston .................. G06F 8/65 |
| 2015/0074659 | A1 * | 3/2015 | Madsen ............. G06F 9/45558 717/177 |
| 2016/0124742 | A1 | 5/2016 | Rangasamy et al. |

OTHER PUBLICATIONS

GitHub, "Parallel Execution of ssh Commands on Multiple Hosts #274", 2016, retrieved from https://github.com/int128/gradle-ssh-plugin/issues/274, 3 pages. (Year: 2016).*

Assmann, "Using HAProxy as an API Gateway, Part 1", 2018, retrieved from https://www.haproxy.com/blog/using-haproxy-as-an-api-gateway-part-1/, 16 pages (Year: 2018).*

Kappagantula, "Microservice Architecture—Learn,Build, and Deploy Applications", 2018, DZone, 9 pages (Year: 2018).*

"Rest Commander: Scalable Web Server Management and Monitoring", REST Commander: Scalable Web Server Management and Monitoring, URL: https://www.ebayinc.com/stories/blogs/tech/rest-commander-scalable-web-server-managment-and-monitoring/, Retrieved Sep. 20, 2018, 7 pages.

"Workflow & Architecture: restructure via AKKA to achieve horizontal scalability", restcommander/Workflow&Architecture.md at master—eBay/restcommander—GitHub, URL: https://github.com/eBay/restcommander/blob/master/Workflow%26Architecture.md, Retrieved Sep. 20, 2018, 4 pages.

"Distributed REST Commander README", restcommander/DistributedReadme.md at master—eBay/restcommander—GitHub, URL: https://github.com/eBay/restcommander/blob/master/DistributedReadMe.md, Retrieved Sep. 20, 2018, 8 pages.

"Intelligent Operations", undefined—Apigee, URL: https://apigee.com/api-management/#/product/operational-intelligence. Retrieved Sep. 21, 2018, 5 pages.

* cited by examiner

PARALLEL SOFTWARE DEPLOYMENT SYSTEM

CROSS-REFERENCE TO RELATED APPLICATIONS

This patent application claims the priority to Indian Provisional Application No. 201811042295, filed Nov. 9, 2018, and U.S. Provisional Application No. 62/820,538, filed, Mar. 19, 2019, contents of which are incorporated by reference herein.

BACKGROUND

1. Technical Field

The present disclosure relates to system and method for software installation, and more specifically to a system for performing parallel program installations.

2. Introduction

Network administration groups in enterprises usually need to have computer application programs installed on a large number of servers before allowing software developers to use them. Older versions of application programs may also need to be upgraded to new versions with updated features or new functionalities. For example, there are some large and complex application programs required to be installed on a large number of Linux servers. A network administrator or user may normally need to log onto each server to install the application programs via a graphical user interface (GUI). However, the program installation process using the GUI may be slow and tedious especially when large and complex programs are to be individually installed on multiple servers. The same inputs may be repeated when installing the same application programs on the multiple servers. Currently, software deployment supports a script-based installation process (i.e., silent/unattended installation) in which user command inputs associated with a program installation on a particular server can be preconfigured into an executable script. Thus, the silent installation performed by the executable script can be operated without user interaction to enter user commands on the GUI screen.

However, current system architectures do not support parallel installation of software on one or more servers. Also parallel installation of software from a user computer is inefficient in current systems. Embodiment of the invention can address these problems and quickly and efficiently install software, freeing the system to perform other tasks.

SUMMARY

An exemplary system for conducting parallel program installations according to the concepts and principles disclosed herein can include: a plurality of backend servers on which a plurality of scripts is executed to automatically install application programs; and an application server, the application server being configured to: receive a plurality of web service calls from a user device via a user interface; locate web services in response to the web service calls; and send a plurality of Secure Shell (SSH) calls to a plurality of backend servers; in response to the web service calls, provide and expose the plurality of the scripts being as the web services, wherein a number of the web service calls processed by the application server are based on a hardware capacity of the application server.

An exemplary computer-implemented method of parallel program installations includes: providing a plurality of scripts, each of the plurality of the scripts being configured to be executed to install application programs on one or more backend servers; receiving, by an application server, a plurality of web service calls from a user device via a user interface; locating, by the application server, web services in response to the plurality of the web service calls; sending, by the application server, a plurality of Secure Shell (SSH) calls to the plurality of the backend servers; and executing the plurality of the scripts to automatically install the application programs on the backend servers in response to the plurality of the web service calls, wherein the plurality of the scripts are exposed as the web services for enabling the plurality of the web service calls, and a number of the web service calls processed by the application server are based on a hardware capacity of the application server.

Another exemplary system for conducting parallel program installations and configured according to the concepts and principles disclosed herein can include: a plurality of backend servers on which a plurality of scripts is executed to automatically install application programs; an application server, the application server being configured to: receive a plurality of web service calls from a user device via a user interface; locate web services in response to the web service calls; and send a plurality of Secure Shell (SSH) calls to a plurality of backend servers, in response to the web service calls, provide and expose the plurality of the scripts being as the web services.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Exemplary embodiments of this disclosure are illustrated by way of an example and not limited in the figures of the accompanying drawings, in which like references indicate similar elements and in which.

It is to be understood that both the foregoing general description and the following detailed description are exemplary and explanatory and are intended to provide further explanations of the invention as claimed only and are, therefore, not intended to necessarily limit the scope of the disclosure.

DETAILED DESCRIPTION

Various exemplary embodiments of the present disclosure will be described in detail below with reference to the accompanying drawings. Throughout the specification, like reference numerals denote like elements having the same or similar functions. While specific implementations and exemplary embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to systems and methods of performing parallel program installations in a script-based installation mode. Scripts may be exposed as Application Programming Interface (API), for example, via a web service. The systems may make parallel and mutually asynchronous web service calls (e.g., API calls) to web services exposing scripts. The scripts can be automatically executed to install multiple application programs in parallel. As will be described in greater detail below, a new and more efficient system architecture is provided. The new architecture can leverage the script-based installation procedure to accomplish parallel program installation onto a plurality of backend servers to gain ample time advantage in a fastest possible way during a short span of time.

In some embodiments, the system is implemented as a three layer architecture in a microservice approach for parallel program installation. The three layer architecture system may include a user interface (UI) layer, an application layer and a backend layer. These three layers are independent of each other in terms of programming language and operation system. In some embodiments, the system makes a plurality of web service calls from the UI layer to the application layer. This may be done using microservice approach. The scripts are associated with different application program installation tasks and exposed as web services for enabling the web service calls. The web services are designed and linked to the executions of the scripts on the backend servers. An application server in the application layer receives the web service calls. The application server may make Secure Shell (SSH) calls through a microservice approach to the backend servers in response to the plurality of web service calls. The application server may communicate with the backend layer such that the scripts are automatically executed to implement multiple parallel program installation. The backend servers may send program installation results back to the application server. The application server may further send the results back to the UI layer in response to the web service calls to indicate a completion of the installation and that the installed application programs are ready for use.

Figure 1:
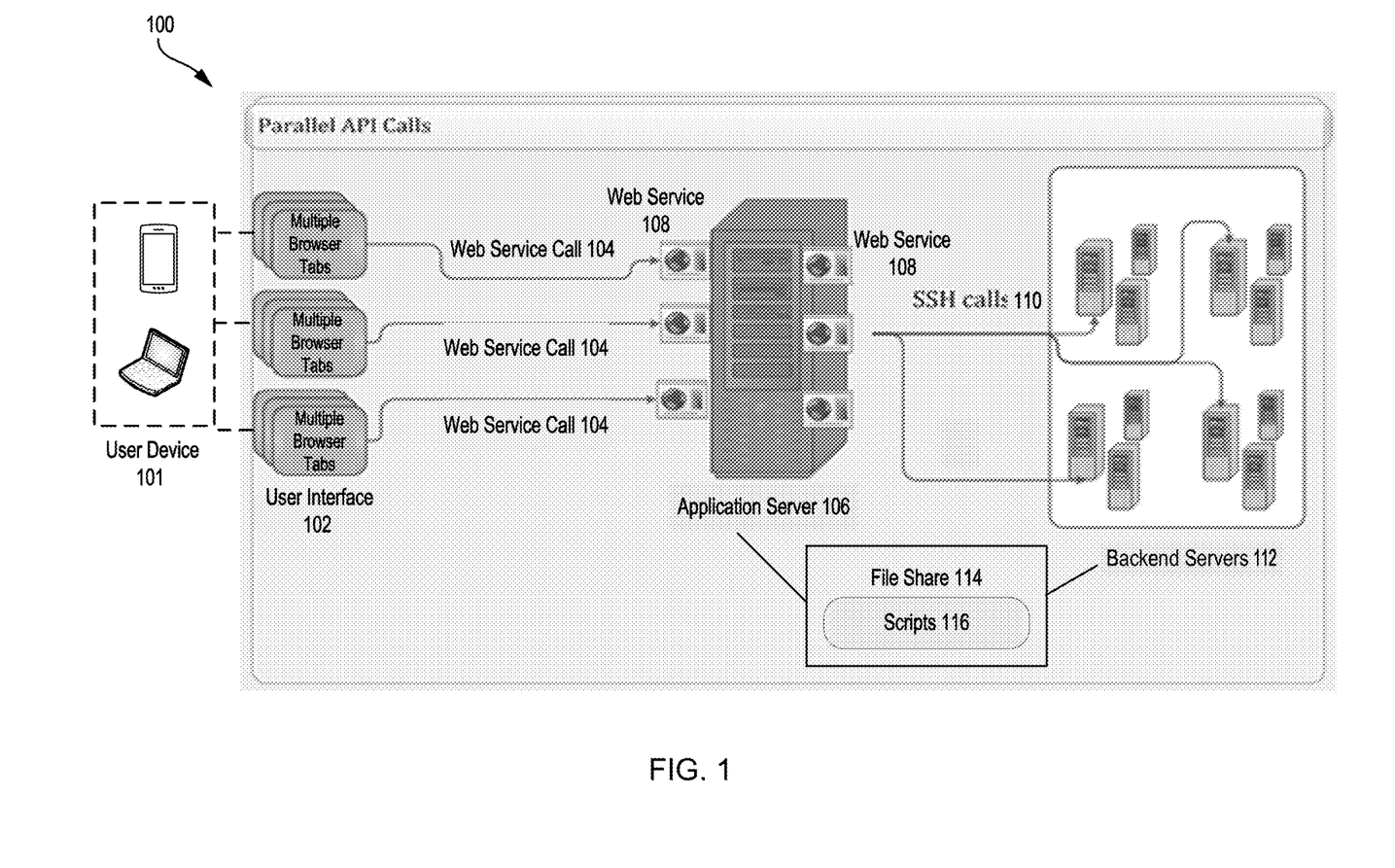
FIG. 1 is a block diagram illustrating an exemplary system architecture in accordance with some embodiments.

The present disclosure provides a simple plug and play opportunity for building microservices. Since all the concerned layers in the system architecture are independent to each other, a user may develop as many microservices and continuously add new functionality to the system. FIG. 1 is a block diagram illustrating an exemplary system architecture 100 configured to perform parallel program application with various activities, scripts, or commands, in accordance with some embodiments. The system architecture 100 is implemented in a microservice approach. The exemplary system architecture 100 generally includes a user device 101, an application server 106, a plurality of backend servers 112, a file share 114, and a network (not shown). As illustrated in FIG. 1, the user interface layer may be represented by the user device 101 including a user interface 102.

The application server 106 represents the application layer. The plurality of the backend servers 112 represents the backend layer.

System tasks are developed with a sequence of services provided by the three layers. In the microservice system architecture, each service runs its own process independently. The three layers in the system architecture 100 may be independent of each other in terms of programming language and operating systems. As such, services and/or tasks in the system can be implemented in different programming languages as required by a particular operating system or platform running on the application server 106 or the backend servers 112. For example, the application server 106 and the backend servers 112 may use different operating systems. These three layers may provide a wide spectrum of possible programming languages used to implement desired deployment tasks.

As illustrated in FIG. 1, the user interface 102 of the user device 101 may be any type of user interface that an end user uses to interact with an application and communicate with the application server 106. The user interface 102 may display any type of web browser running on an operating system of a computing device. The user interface 102 may be a user interface of a mobile application running on a mobile device. The user interface 102 may display various user interface (UI) elements associated with a plurality of web services 108 provided by the application server 106.

In some embodiments, a plurality of parallel web service calls 104 can be sent from the user device 101 to the application server 106 for installing application programs on the plurality of backend servers 112. The plurality of the web service calls 104 can be mutually asynchronous calls for performing multiple installations on the plurality of backend servers 112. The web service calls 104 can be made any time and from any type of user interface 102 through the network. In some embodiments, the web service calls 104 can be made via the user interface 102 of the mobile application on the mobile device. As illustrated in FIG. 1, the plurality of the parallel web service calls 104 may be made via multiple user interfaces 102, which can help the application to be highly scalable and mobile.

In some embodiments, the application server 106 may host an Hypertext Transfer Protocol (HTTP) server to handle each web service call independently as an HTTP request. Each HTTP request may be associated with a web service 108. The multiple HTTP requests can be scaled to higher limits by vertically scaling the application server 106.

The application server 106 may act as an intermediary to locate the plurality of predefined web services 108 in response to the received parallel web service calls. Each web service 108 may be defined with an API to fulfill an installation task corresponding to the web service call from the user interface 102. Each installation task may be configured to have a script to be executed on a backend server 112 to install a particular application program on the backend servers.

The system 100 includes a database or file share 114 for a plurality of executable scripts 116. The scripts 116 may be shell scripts to install application programs on the plurality of the backend servers 112. Each script 116 may be a shell script configured with user command inputs for installing a particular application program on a backend server 112. The user command inputs used for installing application programs via a GUI may be provided in a predefined file. The user command inputs for completing different installation tasks may be completely included in different executable scripts 116. Each executable script 116 can be exposed as a web service 108 and invoked with a web service call 104.

In some embodiments, the executable scripts 116 running on the backend servers are written in a scripting language, such as Bash scripting language. The executable scripts 116 may be written in other scripting languages as required by an operating system running on a backend server 112.

The plurality of executable scripts 116 and various application programs to be installed can be stored in the file share 114 or directly stored on the backend servers 112 as required. The file share 114 may be located in a network file system or any other form of shared storage. The file share 114 can be directly accessed by the application server 106 and the plurality of the backend servers 112 via a network. The corresponding script 116 may be saved in the file share 114 to install the software. The same script 116 may be executed to install the software on different backend servers 112. Additionally, different scripts 116 for implementing different installation tasks may be created and updated easily on the file share 114, thereby reducing a storage requirement of having the same script file duplicated on each of the backend servers.

The system architecture 100 may include a network to facilitate communications between various computing devices associated with the system architecture 100. The network may be a terrestrial wireless network, Wi-Fi, and other type of wired or wireless networks. The network can also be implemented using any type of network topology and/or communication protocol, and can be represented or otherwise implemented as a combination of two or more networks. The application server 106 is in communication with the user interface 102 and the backend servers 112 via the network. The application server 106, the plurality of the backend servers 112 and the file share 114 may be located in the same local area network.

Figure 2:
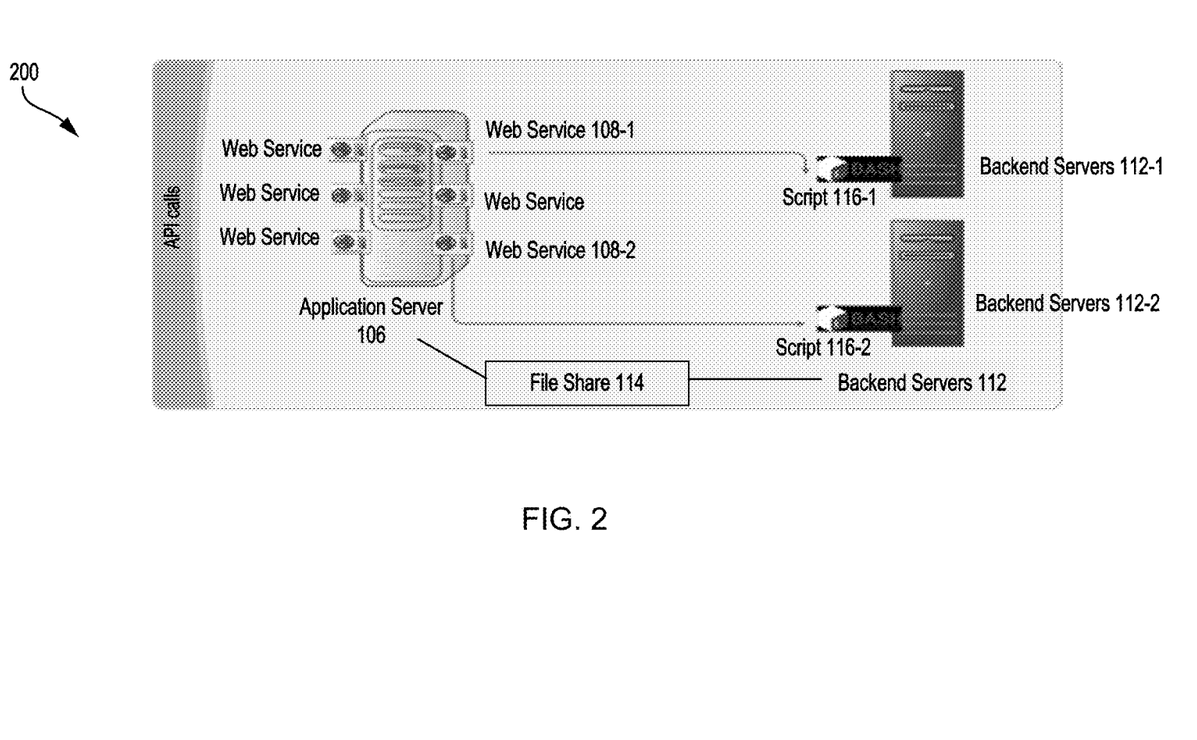
FIG. 2 is a block diagram illustrating an exemplary system configured to provide micro web services with executable scripts in accordance with some embodiments.

Referring to FIG. 2, a block diagram of an exemplary system 200 is illustrated. System 200 is configured to provide micro web services 108 with multiple scripts 116 to be executed on the plurality backend servers 112 in accordance with some embodiments.

The application server 106 handles each web service call 104 independently as an HTTP request associated with a web service 108. The plurality of the scripts are exposed as web services for enabling the plurality of the web service calls. For example, a web service 108-1 may include task information required to have the script 116-1 to be executed on the backend server 112-1 for installing a corresponding application program. A web service 108-2 may include task information required to have the script 116-2 to be executed on the backend server 112-2 for installation a corresponding application program. Each web service may include a REST API with task information, such as a location of a script, a location of a backend server, and a location of the application program to be installed. The web service can provide task information which may be addressable by reference links, such as Uniform Resource Locators (URLs).

Figure 3:
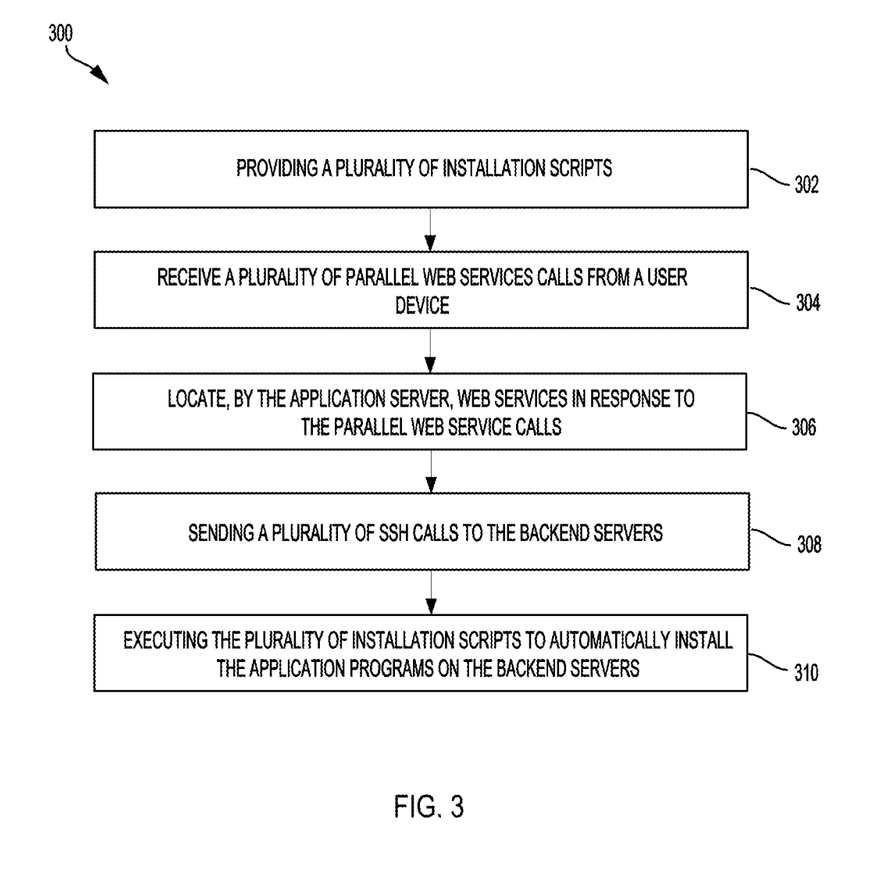
FIG. 3 is a flowchart diagram illustrating an exemplary process for parallel program installations in accordance with some embodiments.

FIG. 3 is a flowchart diagram illustrating an exemplary process for parallel program installations in accordance with some embodiments. The exemplary process 300 may be implemented in the above described systems and may include the following steps. Steps may be omitted, combined, or operated in different orders depending on the operations being performed. The process 300 can be extended to not only installations but any set of activities/scripts/commands that can be executed on an operating system, such as a Linux system. Also the user interface can span across multiple platforms as in browsers, chatbots, servers, etc. The steps or operations of the process 300 can be subdivided into any number of feasible micro solutions. Each micro solution can then be created as a microservice which may ultimately be implemented via a plurality of user interfaces. Each microservice may be independent of each other and can be called in parallel any number of times, thereby reducing the total time of completing a task or process.

At step 302, a plurality of scripts 116 are provided to be executed to install application programs on the plurality of the backend servers 112. The plurality of scripts 116 are predefined with the user command inputs for conducting installation of the application programs on the backend servers 112. Different scripts 116 may be customized with corresponding user command inputs and configured to implement different installation tasks. Different scripts 116 may be created, updated and stored on the file share 114 based on different system and task requirements. The plurality of the scripts 116 stored in a file share 114 may be directly accessible to the application server 106 and the backend servers 112 anytime from anywhere via the network. In response to a web service call to the web service, each script 116 can be executed to install a particular application program on a backend server in real time.

At step 304, the application server 106 receives a plurality of parallel web service calls 104 from one or more user interfaces 102. Each of the web service calls are independent of each other and can be made to the application server 106 anytime and from anywhere via the network. For example, the application server 106 may receive a plurality of web service calls 104 via multiple browser tabs via one computing device or different computing devices on the UI layer. The plurality of web service calls 104 can be made to call the same script 116 to install the same application program on multiple backend servers 112. The plurality of web service calls 104 can be made to call different scripts 116 respectively for installing different application programs on one backend server or multiple backend servers 112. All web service calls may be initiated in a way that the program logic does not wait for the completion of any other web service call. Thus, a user may be allowed to make several web service calls in a single login and to create a mutually asynchronous environment which can be leveraged for accomplishing similar tasks over multiple backend servers.

In some embodiments, a network administrator can open multiple web browsers via one or more user interfaces and make asynchronous parallel web service calls to the application server 106 for implementing parallel installations or some other tasks on different backend servers 112. A number of the parallel web service calls can be processed simultaneously by the application server 106 based on a hardware capacity of the application server 106.

At step 306, in response to the received parallel web service calls 104, the application server 106 may locate the requested web services 108. The web services 108 may be operated asynchronously and independently of each other. Each web service may be identified by a specific URI (Uniform resource identifier) which is selected by the user interface at runtime depending on the user input.

At step 308, the application server 106 may send a corresponding call, such as a Secure Shell (SSH) call 110, to the plurality of backend servers 112 in response to the plurality of parallel web service calls 104. The SSH calls 110 may be made by the application server 106 through a microservice approach to the backend servers 112. The SSH calls 110 may be independent of each other to enable a corresponding secure connection between the application server 106 and each of the backend servers 112 over the network. Each microservice may accomplish a specific task and require certain inputs from the user to work upon. As part of the input, the user may also specify the correct backend server 112 where the SSH call needs to be made. The microservice then uses a standard SSH library to connect to the backend server 112.

At step 310, the plurality of scripts 116 may be executed to automatically install the requested application programs on the backend servers 112. Once a SSH call 110 enables a secure connection between the application server 106 and the backend server 112 over the network, the web service 108 can evoke a corresponding script 116 to be executed to install an associated application program on the backend server 112. Each script 116 may be automatically executed in real time on a backend server 112 based on the embedded commands customized in the script 116. The plurality of scripts 116 may be executed independently of each other on the backend servers 112.

The backend servers 112 may send the execution results back to the application server 106. The application server 106 further sends the execution results back to the user interface 102 to indicate a completion of the parallel program installation.

In some embodiments, a plurality of mutually asynchronous and parallel web service calls 104 may be made to the application server 106 via multiple browser tabs launched from the user interfaces 102. Each of the web service calls is made via a browser tab of a user interface anytime and from anywhere since the user interface 102 is rendered on a web browser.

The system may be utilized to implement a large parallel program installation. From an end user perspective, the system can make a plurality of parallel and mutually asynchronous calls to the application server and automatically implement multiple installations in real time. A user can open multiple browser tabs on the use interface rendered on a web browser to make the parallel and mutually asynchronous calls to the application server. Providing the application server is between the user device and the backend server, the overall system architecture helps to realize the parallelism. The web services provided by the application server in turn call the individual backend server on which the application program needs to be installed so that parallel installation or some other intended tasks can be implemented on the target backend servers. As such, implementation time can be drastically reduced as compared with existing technologies.

The system architecture is able to accomplish a high number of parallel software installations. During parallel program installations in a script-based installation mode, the time taken for 'N' installations can be a little more than the time taken for 1 installation. The extra time is just the time an end user takes to provide command inputs for individual installation. For example, a network administrator needs to log onto a server via a GUI to install an application program manually. It generally takes five minutes to half hour to install the application program on a backend server depending on the size and complexity of the application program and the server system configurations. Using the method of the script-based parallel installation, it takes less than 8 minutes to install the same application program on 5 backend servers.

In another example, there are 15 script-based installation tasks lined up to be implemented in one or more backend servers. Installation tasks do not depend on each other. The system can receive 15 parallel and mutually asynchronous web service calls to the application server. Each script can be exposed as an individual web service and can be executed to implement the associated installation task in parallel. The scripts can be called from the same user interface or different user interfaces via multiple browser tabs. The corresponding plurality of the web services can be provided via the application server to invoke the scripts to deploy the application program onto 15 backend servers in real time. As such, the system operates to save processor time by performing parallel program installations in the script-based installation mode.

In another example, a particular SAP software (Diagnostic agent) is run and installed on 20 backend servers. In a standard execution, each installation usually takes up to 30 mins with a sufficient user interaction to be completed on a backend server. Thus, it may take about 400 mins (e.g., over 6 hours) to complete the installation of the SAP software on 20 servers. When the application program of each installation is performed in a silent or script based mode, it may take less than 5 mins to completely install the application program on each backend server. Since the system allows all installation to run in parallel, the system is able to complete all installation on 20 servers in less than 15 mins. Ideally, it may take 5 mins depending upon the user input speed. Therefore, it may take approximate 15 mins to complete the whole multiple installation process when taking a buffer of 10 mins or so.

The above result shows that the system of performing parallel program installations in a script-based installation mode can decrease the total execution time to approximate $\frac{1}{26}^{th}$ of the original installation time. The gains of this system increase exponentially if the task to be executed on each server is complex and time consuming. Thus, the system is more efficient and the servers are available to process other tasks.

In some embodiments, SAPUI5 may be used as a gateway server and represent an access layer between the application server and a plurality of user devices. The SAPUI5 gateway can be operated to enable web service calls via the user interfaces on different types of computing device.

Figure 4:
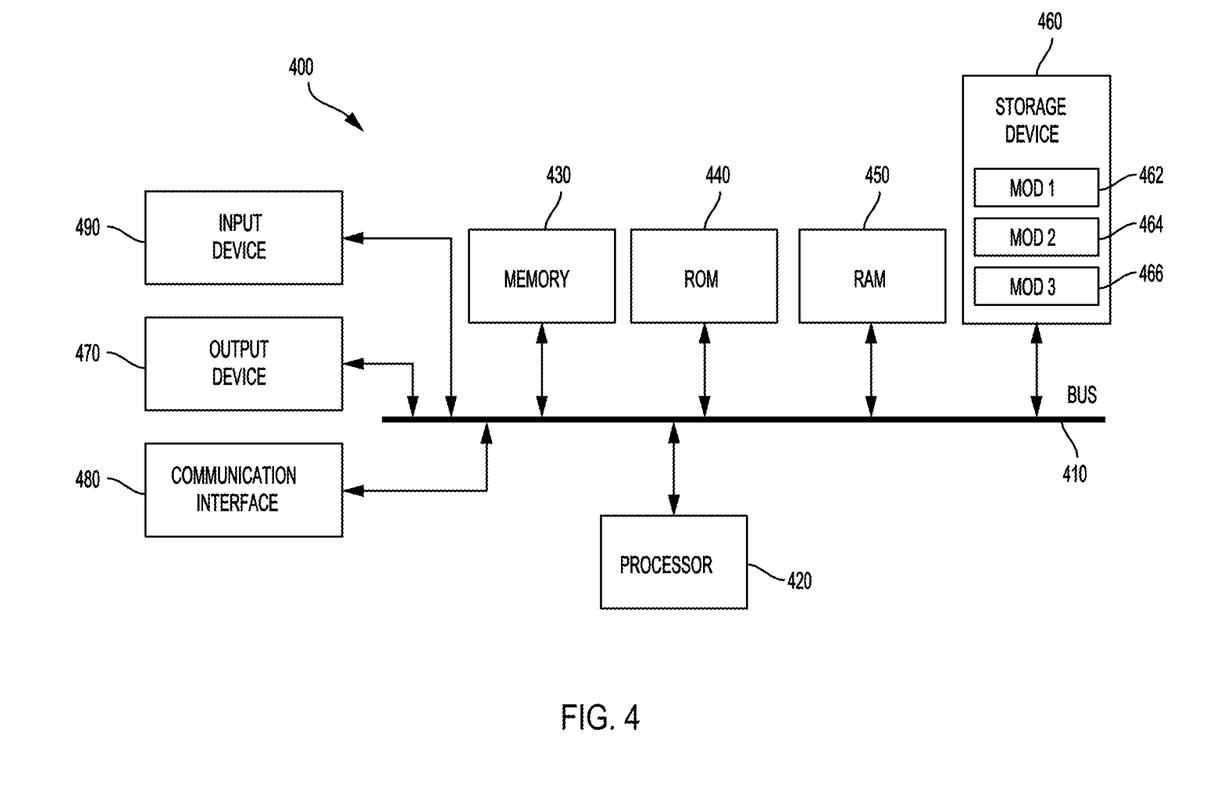
FIG. 4 is a block diagram illustrating an exemplary computing device in accordance with some embodiments.

FIG. 4 is a block diagram of an exemplary computing device 400, which may be used to implement embodiments as disclosed herein. The computing device 400 may be a server, a personal computer (PC), or another type of computing device. The computing device 400 can include a processing unit (CPU or processor) 420 and a system bus 410 that couples various system components including the system memory 430 such as read only memory (ROM) 440 and random access memory (RAM) 450 to the processor 420. The computing device 400 can include a cache of high speed memory connected directly with, in close proximity to, or integrated as part of the processor 420. The computing device 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide non-volatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system for conducting parallel program installation, comprising:

a plurality of backend servers, each backend server of the plurality of backend servers being associated with an executable script of a plurality of executable scripts and each executable script of the plurality of executable scripts including a set of commands, that when executed, cause installation of a particular application program on the backend server the executable script is associated with; and an application server, the application server being configured to:

receive a plurality of parallel web service calls from a user device via a user interface;

in response to receiving the plurality of parallel web service calls, locate a plurality of web services, each web service of the plurality of web services being defined with an API to fulfill an installation task corresponding to a particular web service call of the plurality of parallel web service calls;

for each located web service of the plurality of web services, transmit a corresponding Secure Shell (SSH) call to a corresponding backend server of the plurality of backend servers, causing a secure connection between the application server and each corresponding backend server of the plurality of backend servers; and for each backend server of the plurality of backend servers with a secure connection with the application server, evoke, by a corresponding web service of the plurality of web services, a corresponding executable script of the plurality of executable scripts, evoking a corresponding executable script includes;

automatically installing in parallel, on each of the plurality of backend servers with the secure connection with the application server, each corresponding application program by executing in parallel the set of commands of each of the corresponding executable scripts;

wherein a number of the parallel web service calls processed by the application server are based on a hardware capacity of the application server.

2. The system of claim 1, wherein the user device, the application server, and the plurality of backend servers are independent of each other in terms of programming language and operating system.

3. The system of claim 1, wherein the plurality of parallel web service calls are made via browser tabs launched from one or more user devices.

4. The system of claim 3, wherein the application server receives scripts executed results from each of backend servers that have installed the corresponding application program, and sends the received scripts to the user device to indicate a completion of the parallel program installation.

5. The system of claim 3, wherein the plurality of executable scripts are stored in a fileshare which is directly accessible to the application server and the plurality of the backend servers.

6. The system of claim 3, wherein the plurality of executable scripts are stored on one of the plurality of backend servers.

7. The system of claim 3, wherein the plurality of parallel web service calls are generated using a microservice approach.

8. The system of claim 3, wherein the plurality of parallel web service calls are parallel and mutually asynchronous calls for performing multiple installations on one or more of the plurality of backend servers.

9. A computer-implemented method of parallel program installation, the method comprising:
providing a plurality of executable scripts, each of the plurality of executable scripts including a set of commands, that when executed, cause installation of a particular application program on one or more backend servers of a plurality of backend servers;
receiving, by an application server, a plurality of parallel web service calls from a user device via a user interface;
in response to receiving the plurality of parallel web service calls, locating, by the application server, each web service of the plurality of web services being defined with an API to fulfill an installation task corresponding to a particular web service call of the plurality of parallel web service calls;
for each located web service of the plurality of web services, transmitting, by the application server, a corresponding Secure Shell (SSH) calls to a corresponding backend server of the plurality of backend servers, causing a secure connection between the application server and each corresponding backend server of the plurality of backend servers; and
for each backend server of the plurality of backend servers with a secure connection with the application server, evoke, by a corresponding web service of the plurality of web services, a corresponding executable script of the plurality of executable scripts, evoking a corresponding executable script includes:
automatically installing in parallel, on each of the plurality of backend servers with the secure connection with the application server, each corresponding application program by executing in parallel the set of commands of each of the corresponding executable scripts of the plurality of executable scripts, wherein a number of the plurality of parallel web service calls processed by the application server are based on a hardware capacity of the application server.

10. The method of claim 9, wherein the user device, the application server, and the plurality of backend servers are independent of each other in terms of programming language and operating system.

11. The method of claim 9, wherein the plurality of parallel web service calls are made via browser tabs launched from one or more user devices.

12. The method of claim 9, wherein the application server receives scripts executed results from each of backend servers that have installed the corresponding application program, and sends the received scripts to the user device to indicate a completion of the parallel program installation.

13. The method of claim 9, wherein the plurality of executable scripts are stored in a fileshare which is directly accessible to the application server and the plurality of the backend servers.

14. The method of claim 9, wherein the plurality of executable scripts are stored on one of the plurality of backend servers.

15. The method of claim 9, wherein the plurality of parallel web service calls are generated using a microservice approach.

16. The method of claim 9, wherein the plurality of parallel web service calls are mutually asynchronous calls for performing multiple installations on one or more of the plurality of backend servers.

17. A non-transitory computer-readable medium storing instructions, that when executed by one or more processors, causes the one or more processors to:
receive a plurality of parallel web service calls from a user device via a user interface;
in response to receiving the plurality of parallel web service calls, locate a plurality of web services, each web service of the plurality of web services being defined with an API to fulfill an installation task corresponding to a particular web service call of the plurality of parallel web service calls;
for each located web service of the plurality of web services, transmit a corresponding Secure Shell (SSH) call to a corresponding backend server of a plurality of backend servers, causing a secure connection between an application server and each corresponding backend server of the plurality of backend servers; and
for each backend server of the plurality of backend servers with a secure connection with the application server, evoke, by a corresponding web service of the plurality of web services, a corresponding executable script of a plurality of executable scripts, evoking a corresponding executable script includes:
automatically installing in parallel, on each of the plurality of backend servers with the secure connection with the application server, each corresponding application program by executing in parallel the set of commands of each of the corresponding executable scripts;
wherein a number of the parallel web service calls received by the application server are based on a hardware capacity of the application server.

18. The non-transitory computer-readable medium of claim 17, wherein the user device, the application server, and the backend servers are independent of each other in terms of programming language and operating system.

* * * * *